United States Patent [19]

Sherif

[11] 4,284,530

[45] Aug. 18, 1981

[54] NOVEL SUPPORT FOR CATALYSTS

[75] Inventor: Fawzy G. Sherif, Stony Point, N.Y.

[73] Assignee: Stauffer Chemical Company, Westport, Conn.

[21] Appl. No.: 104,330

[22] Filed: Dec. 17, 1979

[51] Int. Cl.³ .................... B01J 23/22; B01J 21/16; B01J 21/12
[52] U.S. Cl. ........................... 252/455 R; 252/456; 423/535
[58] Field of Search ................ 252/450, 455 R, 456; 423/535

[56] References Cited

U.S. PATENT DOCUMENTS

| | | | |
|---|---|---|---|
| 1,862,825 | 6/1932 | Laury | 423/535 |
| 1,933,091 | 10/1933 | Bertsch | 423/535 X |
| 1,971,465 | 8/1934 | Salazar | 423/535 X |
| 4,206,086 | 6/1980 | Sherif | 252/456 |

*Primary Examiner*—Carl F. Dees
*Attorney, Agent, or Firm*—Henry Z. Friedlander

[57] ABSTRACT

A catalyst for the oxidation of sulfur dioxide comprising vanadium supported by a microporous carrier is disclosed. The microporous carrier is characterized by a silica content greater than 85 percent, an alumina content greater than 3 but less than 5 percent, an iron content less than 2.0 percent, a surface area greater than 10 m²/g, a bulk density more than 0.10 and less than 0.35 g/cc, a mean pore diameter greater than 0.3 and less than 2.5 micrometers, a pore volume greater than 2 ml/g, and a porosity greater than 65 percent. The product containing vanadium is easily extrudable into pellets or other shaped forms to give both a durable and highly active catalyst. Diatomaceous earths of the Actinoptychus class, especially *Actinoptychus undulata*, and of the Coscinadiscus class meet the criteria stated above, as do some acid-leached montmorillonite clays.

10 Claims, 1 Drawing Figure

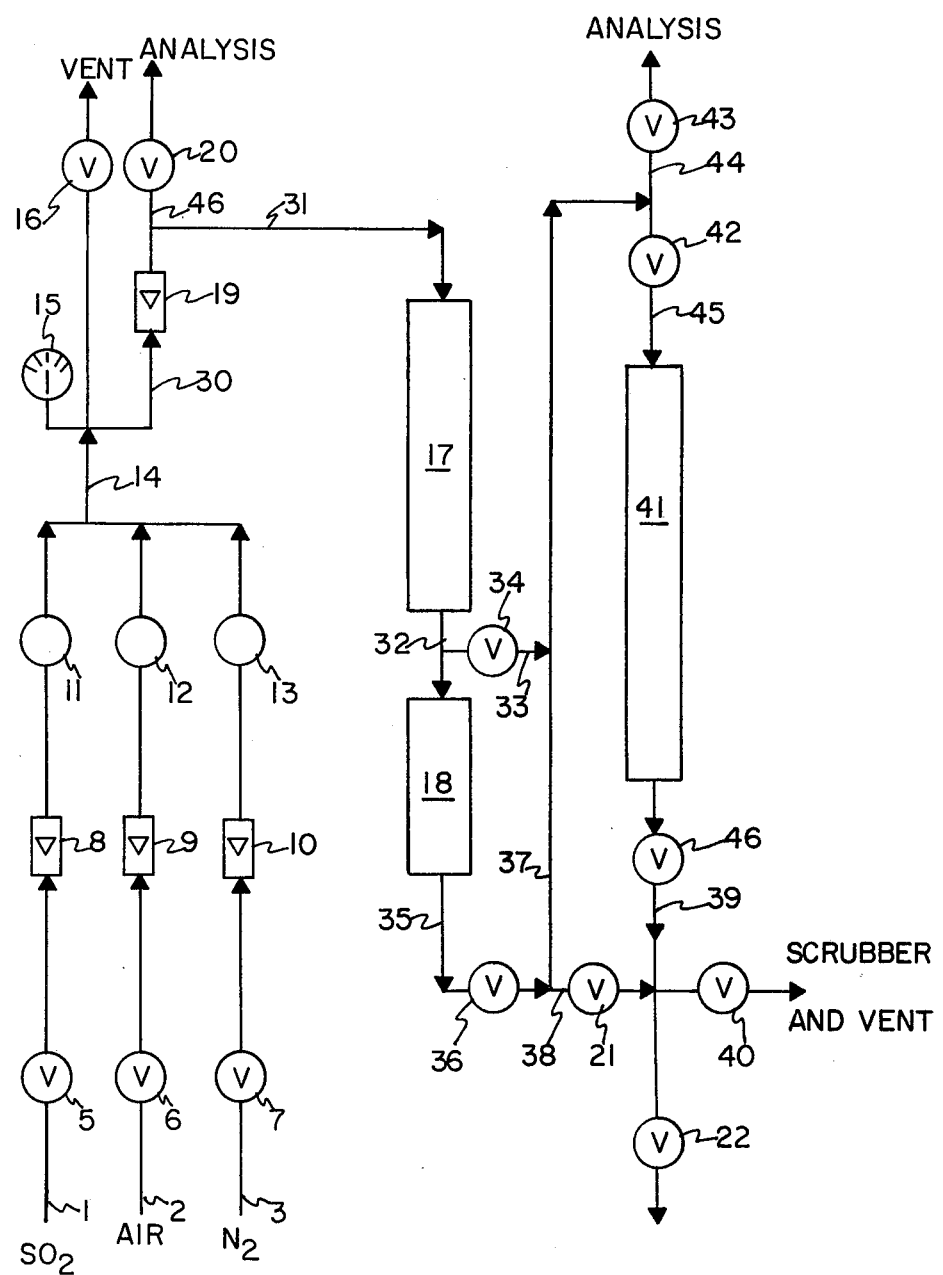

NOVEL SUPPORT FOR CATALYSTS

BACKGROUND OF THE INVENTION

1. Field of the Invention

This invention relates to catalysts for the oxidation of sulfur dioxide. More particularly it relates to supports for such catalysts.

Sulfuric acid is produced on a commercial scale by the vanadium-catalyzed oxidation of sulfur dioxide to sulfur trioxide in the gaseous phase followed by absorption of the sulfur trioxide in an aqueous solution.

It is advantageous to disperse the vanadium active element on a microporous carrier or support. The support has a variety of beneficial functions including a high surface area to increase reaction rate, high porosity to maximize diffusion, physical integrity to minimize dusting, thermal resistance so that the vanadium composition may be molten without fusion of the catalyst particles, molded shaped form to minimize pressure drop, and chemical inertness. Until the instant invention a support providing a catalyst with both high activity and outstanding durability was unknown.

2. Description of the Prior Art

A wide variety of materials has been used as supports for the vanadium type of oxidation catalyst employed in the process for preparing sulfuric acid including brick dust, pumice, zeolite, fuller's earth, clay, quartz, diatomaceous earth, kieselguhr, and silica.

In reissued U.S. Pat. No. 18,380 filed in 1927, granted as U.S. Pat. No. 1,675,308 in 1928 and reissued Mar. 8, 1932 to Jaeger a non-siliceous series of base-exchanging materials are disclosed as catalysts for oxidizing sulfur dioxide including metallates of aluminum, chromium, zinc, vanadium, beryllium, tin, palladium, platinum, titanium, zirconium, tungsten, lead, uranium, tantalum, boron and molybdenum. These are incorporated with siliceous diluents or carrier bodies such as kieselguhrs of all kinds, diatomite brick refuse, pumice meal, pulverized quartz, sand, other minerals, and metal granules. Also disclosed are "celite", neutral silicates, silica gel, ground rocks, tuffs, lava, quartz filter stones, diatomaceous stones, aluminum granules, ferrosilicon, ferrovanadium, ferrochrome, aluminum polysilicates, ground glaucosil, infusorial earth, "celite" earth, "celite" brick refuse, colloidal silica, vanadyl silicate, and other acid-resistant siliceous minerals.

U.S. Pat. No. Re. 19,282 based on U.S. Pat. No. 1,371,004 filed by Slama and Wolf in 1914, granted in 1921, and reissued in 1934 discloses as supports for vanadium-type oxidation catalysts moist pumice powder, natural or triturated kieselguhr, precipitated silicic acid, stannic oxide and stannic hydroxide.

In U.S. Pat. No. 1,696,546 granted to Jaeger and Bertsch on Dec. 25, 1928 the following supports for the catalytic oxidation of sulfur dioxide are disclosed: zeolites and their pseudomorphs analogous to nepheline, leucite, feldspar and the like with exchangeable and non-exchangeable cations of a wide variety of metals; titanium dioxide; and, pulverized rocks rich in quartz, powdered glass, pumice meal, asbestos meal or fibers, kieselguhr, silica, pumice stones, diatomaceous stones, filter stones, quartz, acid-resistant minerals or rocks; roughened metals or metal alloys such as chromium, ferrochromium, ferrovanadium, ferromolybdenum, ferrosilicon manganese, ferrosiliconaluminummanganese, ferromanganese, ferrotitanium, ferrotungsten, ferronickel, ferrochromenickel; burnt pyrites, rutile, ilmenite, titaniferrous iron ore, "celite", manganese oxide, chromium oxide, bauxite, copper oxide, nickel oxide, cobalt oxide, iron oxide, barium oxide and the like.

U.S. Pat. No. 1,862,825 granted to Laury June 14, 1932 discloses powdered diatomaceous earth or "celite" brick chips, both fired to a temperature of about 1000° C. to fuse the particles into a massive form, as supports for vanadium oxidation catalysts.

Krempff discloses in U.S. Pat. No. 3,216,953 granted Nov. 9, 1965 the use of finely divided porous silica as a support for a vanadium-type oxidation catalyst. One such is levilite. Also disclosed is a mixture of 90% natural kieselguhr and 10% carbon black. Silica gel may also be employed, as may micronized siliceous material. In addition to carbon black, micronized sulfur may be used to increase the porosity by burning during calcination of the catalyst mixture.

U.S. Pat. No. 2,029,376 granted to Joseph on Feb. 4, 1936 teaches the use of kieselguhr, finely ground pumice, precipitated silica, stannic hydroxide, or stannic oxide as supports for a vanadium-type catalyst expanded by the combustion of a polysaccharide gum.

The Johns-Manville Co. of Denver, Colo. published a brochure in March 1977 entitled "Glossary of Celite Mineral Filler Applications". On page 17 of this brochure there appears the notation that unspecified "Celite" diatomite fillers may support the vanadium catalyst used in the manufacture of sulfuric acid. At least 36 grades of diatomaceous "Celites" are describe in this brochure.

3. Objects of the Invention

An object of the present invention is to provide a support which can be utilized to form durable, useful, vanadium catalysts in the "contact" process for the oxidation of sulfur dioxide. Another object of the invention is to provide a support for the metallic catalysts of the "contact" oxidation process which furnishes catalysts with a high level of catalytic activity. Other objects of the invention will be apparent to those skilled in the art from the description and examples below.

SUMMARY OF THE INVENTION

According to the present invention, a highly active and durable catalyst containing vanadium for the oxidation of sulfur dioxide may be obtained by utilizing a carrier support characterized by:

(a) a silica content greater than 85 percent by weight;

(b) an alumina content greater than about 3 but less than about 5 percent by weight;

(c) an iron content less than about 2 percent by weight;

(d) a surface area greater than 10 $m^2/g$;

(e) a bulk density of about 0.1 to about 0.35 g/cc;

(f) a mean pore size of about 0.3 to about 2.5 micrometers;

(g) a pore volume greater than 2 ml/g, and (h) a porosity greater than 65 percent.

Diatomaceous earth produced by the marine classes of Coscinadiscus and Actinoptychus, especially *Actinoptychus undulata*, meet these criteria, as do some clays. The catalysts produced on these supports are easily shaped into cylindrical pellets, tablets, spheres, or other forms.

BRIEF DESCRIPTION OF THE DRAWING

The FIGURE is a diagrammatic drawing of the apparatus for measuring the activity of the catalyst.

DETAILED DESCRIPTION OF THE INVENTION

A supported vanadium composition remains after 60 years the standard catalyst for oxidizing sulfur dioxide to make sulfuric acid or for environmental improvement. The mineral support or carrier plays several roles. Firstly, the support provides a surface on which expensive vanadium moieties, often "promoted" by other metal salts, can be deposited in a thin layer to minimize cost. Secondly, a support of high surface area maximizes the activity of the catalyst. A support of high porosity and pore volume maximizes the rate of diffusion of both gaseous reactants and product. Thermal stability of the support allows the vanadium to be in a molten or plastic state, in which its activity is enhanced, while the shaped article maintains its microporous nature without collapse. Chemical stability allows the fragile microporous structure of the support to withstand the hot reactants and product formed by oxidation of sulfur dioxide, that is sulfur trioxide.

The durability of a catalyst can be measured by its resistance to abrasion after heating at about 816° C. for 24 hours in air and cooling to ambient. It is the figure of merit for defining physical thermal stability; resistance to dusting in a hot, gaseous stream; resistance to self-abrasion in a bed of shaped pellets; and spalling, cracking, or crumbling in use.

The preferred chemical composition for high durability and high catalytic activity has been found to be high silica content coupled with moderate alumina content. High silica content is used herein to denote a support containing at least 85 percent silica by weight. The siliceous carriers historically used, listed above in the Description of the Prior Art, have ranged from about 75 to almost 100 percent silica. The presence of alumina enhances carrier durability, but too much lowers its chemical resistance and catalytic activity. In the past carriers with up to 12 weight percent alumina have been used. It has now been discovered that about 3 to about 5 percent is preferred with from about 3.3 to about 3.7 percent highly preferred for the instant invention. Iron content should be below about 2 weight percent to maintain high activity of the catalyst.

Siliceous materials employed as catalyst carriers prior to this invention have ranged in surface area from about 0.1 $m^2/g$ (ground glass and rocks) to over 100 $m^2/g$ (molecular sieves from aluminosilicates). In the practice of this invention surface areas from about 10 to about 50 $m^2/g$ have been found suitable. The useful diatomaceous earths and clays have surface areas from about 20 to about 30 $m^2/g$.

The surface area of microporous supports may be measured by the skilled artisan by means of the adsorption of nitrogen gas. Following the well-known BET (Brunauer-Emmett-Teller) equation, the surface area may be computed from the adsorptive data.

Bulk density of a powdered catalyst support is a measure of its particulate shape and openess. In fact it is preferable to employ the catalyst in the form of a shaped article rather than a powder. Before impregnation of the actual catalytic moieties and before being formed into shaped articles such as spheres, tablets, or the preferred cylindrical pellets, the bulk density of the catalyst supports range from about 0.10 to about 0.35 g/cc. It has now been discovered that the most efficacious catalyst supports have an average loose bulk density before impregnation of about 0.13 to about 0.14 g/cc.

In molded or extruded form the density of finished catalysts for the contact process for making sulfuric acid is generally in the range from about 0.4 to about 0.9 g/cc. The inventor has discovered that for both durability and high catalytic activity the preferred bulk density of the catalyst of the present invention ranges from about 0.50 to about 0.60 g/cc.

The true specific gravity of the microporous, siliceous material used in this invention ranges from about 2.1 to about 2.3 g/cc. It is measured in a pycnometer against distilled water, usually at 25° C.

The pore volume, in ml/g, is determined by the mercury intrusion method according to the method described in Frevel, L. K. and Kressley, L. J., *Anal Chem.*, 35, 1492 (1963). "Modifications in Mercury Porosimetry". The pore volume should be greater than 2 ml/g for the practice of this invention.

The percent porosity is measured by the water titration method, as described in Innes, W. B., *Anal. Chem.*, 28, 332 (1956) "Total Porosity and Particle Densitys of Fluid Catalysts by Liquid Titration". For the supports of the instant invention the percent porosity should be greater than 65 percent, preferably greater than 75 percent.

The mean pore diameter, is determined by the mercury intrusion method as described in Frevel, L. K. and Kressley, L. J., *Anal. Chem.*, 35, 1492 (1963). "Modifications in Mercury Porosimetry". The optimum mean pore size for the siliceous material of this invention ranges from about 0.6 to about 1.5 microns.

At least two types of siliceous materials meet the chemical and physical constraints detailed above to fall within the ambit of the instant invention. One of these is clay; the other diatomaceous earth. Although the invention is not limited by this finding, it has been discovered that acid-leached clay of the montmorillonite type meets the criteria established here as a support for vanadium-type catalysts for the contact process of oxidizing sulfur dioxide.

Diatomaceous earths are highly siliceous residues of either fresh water or marine diatoms. Because these skeletal residues of microorganisms have highly angular shapes they have the requisite low bulk density. The skeletal nature of the deposits insure the necessary microporosity for this invention. It has been found that members of the Actinoptychus group of diatoms, especially *Actinoptychus undulatus*, meet the chemical and physical specifications for the practice of the instant invention as carrier supports for vanadium catalysts. Members of the Coscinadiscus class meet the chemical and physical parameters of the supports of the present invention and can be satisfactorily utilized.

The catalytic compositions utilizing the supports described above may be prepared by the techniques already published in U.S. Pat. No. 4,126,578 granted Nov. 21, 1978 or in copending application Ser. No. 862,807 filed Dec. 21, 1977.

Typically the siliceous material is mixed with a vanadium composition to provide a catalyst with a vanadium content of from 4 to 10 percent expressed as the pentoxide. Normally the mixture is wetted with water, shaped, and dried before calcining. Alternatively, one may impregnate shaped support bodies such as tablets, pellets, spheres, fibers, cylinders, and the like. Drying is generally accomplished at temperatures between about 100° and 250° C. Preferably temperatures of about 120° to 160° C. are employed in order to remove most of the water from the shaped bodies without changing the chemical nature of the vanadium or of the various promoters, activators, or additives. Promoters are generally compounds of alkali metals or minor amounts of compounds containing cobalt, nickel, calcium, barium, iron, and the like.

If calcining is desired in the particular catalyst employing the supports of this invention, it may be performed at about 400° to about 600° C. for about one to about 24 hours, preferably from one to four hours, to remove the last traces of moisture and to strengthen the agglomerated, shaped forms.

The calcined support may be activated (often termed sulfated), expecially if sulfur dioxide has not been used in pretreating the vanadium solution prior to impregnation. Sulfation may be carried out in a gaseous stream containing oxygen and small amounts of from about 2 to about 6 percent by weight of sulfur trioxide containing about 1 to about 3 percent by weight of sulfur dioxide. Sulfation may take place at about 100° to about 550° C.

Optionally, a post-treatment step at 500° to 650° C. with oxygen and sulfur dioxide alone for one to four hours may be employed to enhance the crystallinity of a finished catalyst product.

The activity of the catalysts described in the examples was determined by measuring the conversions obtained by passing a gas stream containing sulfur dioxide, sulfur trioxide, oxygen and nitrogen over the catalysts at a controlled rate and temperature in the apparatus of the FIGURE.

The activity of the catalyst was determined by measuring the amount of sulfur dioxide converted to sulfur trioxide in partially reacted gas stream. A gas stream containing sulfur dioxide, oxygen and nitrogen is first passed over a sulfur dioxide oxidation catalyst to convert from about 90 to about 97% of the sulfur dioxide to sulfur trioxide. The partially converted gas stream is passed over the catalyst to be tested. The catalyst being tested is maintained at a controlled temperature and the flow rate of gas containing sulfur dioxide contacting the catalyst is also carefully controlled. The sulfur dioxide content of the gas stream before and after contact with the catalyst being tested is measured. An activity coefficient for the particular catalyst is determined from the concentration of oxygen, sulfur dioxide and sulfur trioxide in the gas stream entering the test reactor and the concentration of oxygen, sulfur dioxide and sulfur trioxide in the gas stream leaving the test reactor at the temperature of testing.

The apparatus for catalyst testing is shown in the FIGURE; the calculation is given below. Cylinders of dry sulfur dioxide, air and nitrogen properly pressure-reduced are connected to lines 1, 2 and 3, respectively. The systems for metering the three gases are the same. The gases at a pressure of about 1.7 kg/cm² gauge enter the system and pass through shut-off valves 5, 6 and 7 in the sulfur dioxide, air and nitrogen lines. The gases are metered at a pressure of about 1.7 kg/cm² through rotameters 8, 9 and 10 and low flow control means 11, 12 and 13. The gases are mixed in line 14 at a pressure between about 1.07 to 1.15 kg/cm². The pressure in line 14 is monitored by pressure gauge 15. Vent valve 16 in line 14 permits the mixture of gases to be passed to the vent until the required mixture of gases is obtained. The total flow of mixed gases passing through line 30 is measured by rotameter 19. The mixed gas stream is passed through line 31 to reactor 17. A sample can be taken through line 46 and valve 20 to determine the concentration of sulfur dioxide in the gas stream.

Reactors 17 and 18 are electrically heated reactors and contain a sulfur dioxide oxidation catalyst. Reactors 17 and 18 are utilized to convert a portion of the sulfur dioxide in the gas stream to sulfur trioxide. One or two reactors are utilized depending upon the amount of preconversion desired for a particular run. The preconverted gas leaving reactor 17 passes through line 32 and can pass through line 33 and valve 34 to line 37 and directly to test reactor 41 through valve 42 and line 45. If additional preconversion is required, the partially converted gas stream may be passed through reactor 18, line 35 and valve 36 to line 37 which passes the preconverted gas to test reactor 41.

A sample of the preconverted gas in line 37 is removed from the system through line 44 and valve 43 for analysis. The preconverted gas stream is passed through valve 42 and line 45 to test reactor 41.

Test reactor 41 is immersed in a heated fluidized sand bath which is controlled to maintain the proper temperature in the reactor. The test reactor 41 has an inside diameter of 2.5 cm. Fifty cubic centimeters of catalyst is introduced into the reactor for testing. The effluent from the test reactor is passed through valve 46 in line 39 and passed through valve 40 to the scrubber and the vent. A sample for analysis can be taken from the system through valve 22.

Reactor 41 can be by-passed by passing the preconverted gas through line 38 and valve 21 to line 39.

During testing of a catalyst the sulfur dioxide concentrations in the gas stream entering the test reactor through line 45 and leaving the reactor through line 39 are monitored. The gas mixture entering reactors 17 and 18 through line 31 is adjusted to contain about 9.5 percent sulfur dioxide, about 11.4 percent oxygen and the balance, nitrogen. The catalyst being tested is equilibrated by passing the preconverted gas stream over the catalyst at the test temperature for two hours before sampling the gas stream. The sulfur dioxide concentration in the preconverted gas stream and in the gas stream after contact with the catalyst being tested is determined by iodometric titration.

The amount of sulfur dioxide and oxygen in the gas stream entering and leaving the test reactor is measured. The rate constant k, is computed from the data using the following rate expression.

$$\text{rate} = k \left( \frac{P_{so2}}{P_{so3}} \right)^{0.5} \cdot P_{O2} \left( 1 - \left( \frac{P_{so3}}{P_{O2}^{0.5} \cdot P_{so2} \cdot k_{eq}} \right)^{0.5} \right)$$

where
$k_{eq}$ = equilibrium constant
log $k_{eq}$ = 5186.5/$T_A$ − 0.611 log $T_A$ − 6.7497
$T_A$ = temperature, °K.
$P_{so2}$ = partial pressure of $SO_2$ in atmospheres
$P_{SO3}$ = partial pressure of $SO_3$ in atmospheres formed by contact with the catalyst being tested
$P_{O2}$ = partial pressure of $O_2$ in atmospheres $$\text{The rate constant } k = \frac{g \text{ moles } SO_2 \text{ converted}}{\text{atmosphere} \times \text{second} \times \text{gram catalyst}}$$

The rate constant $k_v$ reported herein = k × bulk density of sulfated catalyst in grams per cubic centimeter.

The durability of the catalyst (Accelerated Abrasion Loss) is measured by heating 150 grams of the fresh catalyst pellets at 816° C. for 24 hours. The catalyst pellets are then contacted with a gas mixture containing about 4.0 percent sulfur dioxide and about 5.0 percent sulfur trioxide for two hours at 432° C. A 100 gram sample of the heated and reacted catalyst is shaken over a standard 20 mesh sieve, Tyler Sieve Series, for one hour using a Rotap shaker. The loss in weight after shaking for one hour indicates the durability of the catalyst. The durability of the catalyst is indicated as the percent loss through the 20 mesh screen. The lower numbers indicate a more durable catalyst. This Accelerated Abrasion Loss test has been found to correlate closely with durability experienced with sulfur dioxide oxidation catalysts under commercial process operation conditions.

The instant invention is illustrated but not limited by the following examples.

EXAMPLE 1

This example illustrates the improved catalytic activity and durability of a vanadium catalyst made from a support of this invention.

A marine diatomaceous earth, light gray in color, generally dominated by honeycomb particles of the Actinoptychus, Coscinodiscus, and *Actinoptychus undulatus* structures was chosen. Its alpha-crystobalite content was less than one percent. Particles within the range of 6 to 20 microns constituted 79 percent by weight with 0.1 percent left on a 150-mesh screen and 0.5 percent left on a 325-mesh (Tyler Sieve Series). The surface area was measured as 20 $m^2/g$; the mercury porosity 3.25 cc/g; the average pore diameter was 0.9 micron; the loose bulk density was 0.132 g/cc; the alumina content was 3.5 percent, the silica content was found to be 86 percent and the free moisture 2.7 percent. Water absorption at 25° C. was 250 percent by weight.

A test catalyst was prepared by dry mixing 109 parts of vanadium pentoxide, 302 parts of potassium sulfate, and 830 parts of the diatomaceous earth described above. About 850 parts of water was added and thoroughly mixed with the dry powders in a Hobart Mixer to form a paste suitable for extrusion. This paste was extruded by means of a California Pellet Mill into 6.5 millimeter to 12.7 millimeter (mm) cylindrical pellets 5.6 mm in diameter. After eight hours of drying at 120° C., the pellets were calcined at 538° C. for four hours, and sulfated in a dilute stream of oxygenated $SO_2$—$SO_3$ for two hours at 432° C. The final catalyst pellets had a bulk density of 0.512 g/cc.

By the method previously described above and in the apparatus of the FIGURE the activity of the catalyst was measured. The volume rate constant, $k \times 10^{-7}$ at 432° C. (810° F.) was found to be $128 \pm 13$.

The catalyst was tested by the accelerated abrasion loss test previously described; the abrasion loss for this catalyst was 2.7 percent.

As a basis for comparison, two commercial vanadium-type catalysts for the contact oxidation of sulfur dioxide were tested for catalytic activity and durability according to the above methods.

One sample called catalyst D, based on a siliceous support available from the Grefco, Inc. of Los Angeles, Calif., gave a volume constant, $k \times 10^{-7}$ activity of $129 \pm 12$, and an accelerated abrasion loss of 26 percent, ten-fold greater than the abrasion loss of the catalyst of the present invention.

Another commercial contact catalyst, called Catalyst C, based on a support available from the Eagle-Pitcher Co. of Cincinnati, Ohio gave an activity constant of $110 \pm 2$, and an accelerated abrasion loss of 3.1 percent.

Neither commercial catalyst C nor D utilize the improved supports of this invention. One catalyst has the high durability but not the high catalytic activity of the catalyst of this invention.

EXAMPLES 2–6

Examples 2–6 illustrate post-treatment of the catalyst of Example 1 resulting in higher catalytic activity and comparable durability. These results depend on the improved carrier support of the present invention.

The same support, chemicals, and procedures as in Example 1 were employed to make a dried, calcined, and activated catalyst. Then, an additional post-treatment was carried out by contacting the catalyst with a gaseous stream containing 9.5 percent sulfur dioxide, 11.4 percent oxygen, and the balance nitrogen for two hours at the following temperatures with the following results:

| Example | Post-treatment Temperature (°C.) | Activity Constant $K \times 10^{-7}$ at 432° C. |
|---|---|---|
| 2 | 538 | $164 \pm 4$ |
| 3 | 566 | $174 \pm 37.4$ |
| 4 | 593 | $182 \pm 8$ |
| 5 | 621 | $176 \pm 4$ |
| 6 | 637 | $172 \pm 4$ |

These conditions typify commercial practice. It is seen that about 600° C. is the optimum point for catalytic activity.

X-ray diffraction studies at angles two theta equal to 10.2°, 16.9°, 17.1°, 23.1°, 24.2°, 24.8°, 25.4°, 26.1° and 27.4° showed that the structural effect of this post-treatment is to enhance crystallinity.

EXAMPLE 7

This example illustrates the use of a different siliceous material of the Actinoptychus/Coscinadiscus group to make the vanadium-containing oxidation catalyst of this invention.

The diatomaceous earth had a silica content of 86 percent, an alumina content of 3.3 percent, a water absorption of 190 percent, as measured by a modified Gardner-Coleman titration method, a free moisture content of 3.5 percent and a surface area of 24 $m^2/g$. Its alpha-cristobalite content was less than one percent. The loose bulk density was 0.144 g/cc. The material had the following screen analysis (Tyler series): 0.4 percent retained on a 150-mesh screen and 1.5 percent retained on a 325-mesh screen.

To make the catalyst 72.6 g of vanadium pentoxide, 201 g of potassium sulfate and 553 g of CELITE 211 were mixed in a Hobart mixer. To this mixture 600 g of water was added and thoroughly mixed to form an extrudable paste. The extrusion, drying, and activation were carried out as in Example 1.

In the apparatus of the FIGURE, the catalytic activity volume constant, $k \times 10^{-7}$, was determined; the value was $126 \pm 12$. The accelerated abrasion loss was 4.0 percent, showing that both high activity and high durability had been achieved.

EXAMPLE 8

This example illustrates the use of a different method for preparing vanadium-type catalyst on the carrier support of this invention; both high catalytic activity and high durability were achieved.

A suspension of 101.7 g of ammonium vanadate in 150 ml water was mixed with a solution of 48.6 g potassium hydroxide and 150 ml water. After mixing the mixture was boiled until the evolution of ammonia had ceased, about 20 minutes. The resulting solution of potassium vanadate was combined with a solution of 151.2 g of potassium oxalate monohydrate in 200 ml water, heated to 80° C., and then diluted to 550 ml at that temperature.

The same diatomaceous earth as used in Example 1, containing predominantly Actinoptychus diatoms in the amount of 600 g was stirred in a Hobart mixer while the heated solution of potassium vanadate/potassium oxalate was added dropwise for approximately one hour. The damp, impregnated powder was then extruded into 5.5 millimeter (mm) diameter pellets 6.5 to 12.7 mm long.

The drying step was carried out in an oven at 140° C. for eight hours. Activation took place in a gas stream containing 4 percent sulfur dioxide and 5 percent sulfur trioxide for four hours at 205° C. to yield a catalyst containing the vanadyl-vanadate moiety expressed as 8 percent, by weight, vanadium pentoxide.

The catalytic activity for this product was measured in the apparatus shown in the FIGURE at 432° C. giving a volume constant $k \times 10^{-7}$ of $132 \pm 13$. The loss in the accelerated abrasion test was only 0.2 percent.

EXAMPLE 9

The procedures of Example 8 were repeated employing 33.9 g ammonium vanadate in 50 ml water, 16.2 g potassium hydroxide in 50 ml water, 50.4 g potassium oxalate monohydrate in 75 ml water, and a final volume of 225 ml at 80° C. The same cylindrical pellets were formed from 300 g of diatomaceous earth, containing predominantly Actinoptychus diatoms. The same impregnation, drying, and activation as in Example 8 was carried out to produce a catalyst containing vanadyl-vanadate moiety expressed as 5.5 percent by weight of vanadium pentoxide.

In the apparatus of the FIGURE, the volume activity constant, $k \times 10^{-7}$, was found to be $144 \pm 18$. The final bulk density was 0.568 g/cc. The accelerated abrasion loss was found to be 1.7 percent, again showing a high activity and high durability employing the support of this invention.

COMPARATIVE EXAMPLE 10

This example illustrates the low catalytic activity but high durability resulting from the use of a vanadium catalyst supported by a carrier, which does not meet the criteria established by the instant invention.

The diatomaceous earth employed, known as Celite 219 (Johns Manville, Denver, Colo.), has an alpha-cristobalite concentration of 56 percent leading to a high crystallinity and low surface area of 3 m²/g. It showed a bulk density of 0.14 g/cc, a free moisture of only 0.1 percent, an alumina content of 3.3 percent and a silica content of 92 percent. Its water absorption was 210 percent. There was essentially no retention on 150-mesh or 325-mesh screens (Tyler Sieve Series). This material had been calcined with a flux at the mine.

A vanadium-type catalyst was prepared by the method of Example 1 leading to a volume activity constant, $k \times 10^{-7}$, of only 68 at 432° C. The durability was measured by the accelerated abrasion test to give value of 0.3 percent loss. This combination of properties is characteristic of many products of the prior art.

COMPARATIVE EXAMPLE 11

This example illustrates the unsuitability of diatomaceous earths which do not meet the standards of the instant invention for preparing vanadium-containing catalysts for the contact process for making sulfuric acid.

A pinkish, calcined diatomaceous earth of low surface area, 5 m²/g, low free moisture, 0.3 percent and a low water absorption 170 percent, was chosen. After mixing and impregnation, as described in Example 1, with various proportions of water, attempts were made to mold cylindrical pellets in a California Pellet Mill. The damp mixture agglomerated and cemented to such an extent that no molded catalyst could be produced.

COMPARATIVE EXAMPLE 12

This example illustrates another unsuitable diatomaceous earth which fails to meet the criteria of the instant invention but which by the disclosures of the prior art would be considered for the production of vanadium-containing catalysts.

The diatomaceous earth chosen for this experiment, had many of the superficial qualities of a catalyst support. Its bulk density was 0.136 g/cc; its moisture absorption 150 percent; essentially no retention on a 150-mesh screen and 0.5 percent retention on a 325-mesh screen; mercury porosity 75 percent; free moisture 0.5 percent. The true specific gravity was 2.3. The surface area was low, about 2 m²/g, and it was not chemically inert showing a pH of about 9.5 in water.

As in Comparative Example 11, after mixing and impregnation with water in various proportions no moldable extrudates could be formed.

COMPARATIVE EXAMPLE 13

This example illustrates the unsuitability for making vanadium-containing catalysts of potential supports which do not meet the chemical criteria of this invention.

A diatomaceous earth was chosen for experimentation. It had a surface area of 40 m²/g, a water absorption of 150 percent, an average pore diameter of 0.87 micron, an alumina content of 8.5 weight percent and iron content of 2.8 percent.

Following the mixing, extrusion, drying, calcining, and activation procedures described in Example 1 a vanadium-containing catalyst was made. In the apparatus of the FIGURE the catalytic volume activity was determined, $k \times 10^{-7}$, as $74 \pm 6$ at 432° C., which is unsuitably low.

COMPARATIVE EXAMPLE 14

This example illustrates how an unsuitable candidate material for supporting a vanadium-containing catalyst, which is outside the criteria of this invention, can be brought within the scope of the invention by chemical modification and thus form the basis for a useful catalytic product.

A powdered clay was selected with a surface area of 300 m²/g, a free moisture content of 1 percent, and a bulk density of 0.67 g/cc. Chemical analysis revealed a low silica content of 72.7 percent, suitable iron oxide content of 1.4 percent, and a very high alumina content of 17 percent by weight.

When this clay was mixed by the procedure of Example 1, it cemented to a hard agglomerate with a massive collapse of physical volume. No extruded catalyst could be formed.

Thereupon, another sample was treated at 75°–95° C. for 45 minutes with 50 percent sulfuric acid and then allowed to cool for 16 hours. The extracting liquor was removed by filtration, and the modified clay washed four times with hot water at 60°–70° C. Upon analysis, it was found that the alumina content (originally 17 percent) had been decreased by this hot acidic leaching to 4.76 percent; the surface area was 18 m²/g.

The acid-leached product was wetted to form a paste, which was then extruded into cylinder of 5.5 mm diameter, or 6.4 to 13 mm long. These pellets were dried at 120° C. for eight hours. Then the dried extrudates were impregnated according to the procedures of Example 8 except that only two-thirds the amount of vanadium pentoxide, ammonia, and potassium oxalate were employed in order to make a catalyst with less of the expensive vanadium content than that of Examples 1–8. The drying, calcining, and activation steps were carried out as in Example 7 to make a product containing the vanadyl-vanadate moiety expressed as 5.5 percent pentoxide by weight. The products of Examples 1–8 all have vanadium oxide contents of about eight percent.

Upon measuring the catalytic activity of this doubly modified product in the apparatus of the FIGURE, a volume activity constant, $k \times 10^{-7}$, value of $153 \pm 4$ at 432° C. was found. This is noteworthy, especially considering the decreased vanadium content. The accelerated abrasion loss was 3.7 percent, showing excellent durability.

The foregoing examples illustrate the utility of the present invention. The scope of legal protection sought for this invention is set forth below:

I claim:

1. A vanadium-containing catalyst for oxidizing sulfur dioxide supported by a microporous siliceous material said support characterized by:
   (a) a silica content greater than 85 percent by weight;
   (b) an alumina content greater than 3 but less than 5 percent by weight;
   (c) an iron content less than 2 percent by weight;
   (d) a surface area greater than 10 m²/g;
   (e) a bulk density greater than 0.10 and less than 0.35 g/cc;
   (f) a mean pore diameter greater than 0.3 and less than 2.5 micrometers;
   (g) a pore volume greater than 65 percent; and
   (h) a porosity greater than 65 percent; whereby a catalyst with high catalytic activity and high durability is provided.

2. A catalyst as described in claim 1 with a vanadium content between one and ten percent by weight expressed as vanadium pentoxide.

3. A catalyst as described in claim 1 wherein said microporous siliceous support comprises a major portion of particles of the Actinoptychus type of marine diatomaceous earth.

4. A catalyst as described in claim 1 wherein said microporous siliceous support comprises a major portion of particles of the *Actinoptychus undulatus* type of diatomaceous earth.

5. A catalyst as described in claim 1 wherein said microporous siliceous support comprises a major portion of particles of acid-leached montmorillonite clay.

6. A catalyst as described in claim 1 in the form of cylindrical pellets.

7. A catalyst as described in claim 1 in the form of tablets.

8. A catalyst as described in claim 1 in the form of spheres.

9. A catalyst as described in claim 1 in the form of a powder a major portion of whose particles are less than twenty micrometers in diameter.

10. In a vanadium-containing catalyst carried on a microporous siliceous support the improvement comprising the use of diatomaceous earth of the Actinoptychus class as the support, whereby both high durability and high catalytic activity result.

* * * * *

UNITED STATES PATENT AND TRADEMARK OFFICE
CERTIFICATE OF CORRECTION

PATENT NO. : 4,284,530
DATED : August 18, 1981
INVENTOR(S) : Fawzy G. Sherif

It is certified that error appears in the above-identified patent and that said Letters Patent are hereby corrected as shown below:

Col. 8, line 26, change "174 ± 37 4" to -- 174 ± 4 --.

Signed and Sealed this

Twelfth Day of January 1982

[SEAL]

Attest:

GERALD J. MOSSINGHOFF

Attesting Officer

Commissioner of Patents and Trademarks